United States Patent
Frenkel

[11] 3,835,883
[45] Sept. 17, 1974

[54] STRAIGHTWAY VALVE

[76] Inventor: Mark Isaakovich Frenkel, ulitsa Karbysheva, 6, korpus 2, kv. 20, Leningrad, U.S.S.R.

[22] Filed: Aug. 15, 1973

[21] Appl. No.: 388,419

[52] U.S. Cl............................ 137/512.1, 137/516.11
[51] Int. Cl............................................. F16k 15/16
[58] Field of Search........ 137/512.1, 512.15, 516.11

[56] References Cited
FOREIGN PATENTS OR APPLICATIONS
1,227,939  4/1971  Great Britain................... 137/512.1

Primary Examiner—Robert G. Nilson
Attorney, Agent, or Firm—Holman & Stern

[57] ABSTRACT

A straightway valve for compressors in which there is provided a disk defined by flat seats and elastic plates clasped or clamped by shrink rings. The valve has a supporting shoulder for installation in a compressor cylinder. One of the shrink rings is mounted upon the lateral surface of the shoulder.

As a result, the valve has a comparatively low height and, consequently, a comparatively low resistance and dead-zone volume and is suitable for use in high-speed compressors.

5 Claims, 2 Drawing Figures

PATENTED SEP 17 1974 3,835,883
SHEET 1 OF 2

STRAIGHTWAY VALVE

BACKGROUND OF THE INVENTION

The present invention relates to compressors and positive displacement pump valves and in particular to straightway compressor valves.

The invention may be used with the greatest advantage in straightway valves of piston compressors with a relatively small piston stroke, for example, of refrigeration piston compressors, when requirements imposed upon straightway valves include, apart from reducing power losses, a cut-down in the volume of the valve's dead-zone.

PRIOR ART

In the prior art, there is a straightway compressor valve including a disk made up by a series of alternating flat seats and elastic plates arranged along parallel chords of the disk and clasped by shrink rings, with the valve having a supporting shoulder mounted on the lateral surface thereof for its installation in a compressor cylinder.

The seats are made as rigid strips with a rectangular cross-section having on one side, transverse grooves for the passage of a medium and on the other, recesses for the movement of adjacent elastic plates when the valve is open.

The extreme lateral seats are made as segments provided with grooves for the passage of a medium on the side of the adjoining elastic plates. Located in the middle of the valve, along the diameter of the disk, is a circuit block in which are arranged in parallel planes contacting with the elastic plates recesses for the movement of the latter due to the pressure of a medium as the valve is open.

The elastic plates are clamped between the seats (the two middle plates being clamped between the seat and the circuit block), forming an open rectangular loop. In order to ensure mobility of the middle portion of each plastic plate, these are provided with transverse slots. Thus, a set of elastic plates and seats forms a disk provided in its middle, relative to its height, with a supporting shoulder for the valve to be secured in the seat of a compressor cylinder and sealed therein with a sealing ring mounted on the end face surface of the supporting shoulder. The valve components are fastened together by shrink rings arranged on both sides of the valve's supporting shoulder.

The shrink rings have a tapered bearing surface and are fixed, relative to the height of the valve, by locking plates having T-shaped heads. The lateral seats are provided with grooves for the heads of the locking plates which, after a shrink ring is fitted, are bent over the end face thereof.

A disadvantage of the above valve is that placing shrink rings on both sides of the supporting shoulder results in an increased height of the valve, thus leading to an increase in the dead-zone in the channels of the valve. This, in turn, necessitates an increase in the dimensions of the compressor cylinder. Besides, an increase in the height of the valve requires more metal in the manufacture thereof.

An increase in the dead-zone volume results in the accumulation of a certain amount of a compressed gas in such zone of the valves, as the gas is being compressed in the compressor cylinder. The gas thus accumulated expands, leaks into the chamber of the cylinder and fills part of its volume, thereby reducing the efficiency of the compressor. Another undesirable effect of the dead-zone is an increase in the specific power consumption of the compressor.

Plates in a valve of s substantial height are marked by a considerable width of the movable part thereof. This augments the time lag of the valve, makes it less quick-acting and limits the possibility of using conventional straightway valves in high-speed compressors.

OBJECTS AND SUMMARY OF THE INVENTION

It is an object of the present invention to eliminate the above disadvantages and provide a straightway valve having a substantially smaller dead-zone volume, as compared to conventional valves, and thus making for greater efficiency and effectiveness of compressors.

The above and other objects are attained in a straightway valve including a disk defined by alternating flat seats and elastic plates arranged along parallel chords of the disk and clasped by shrink rings, with the valve having a supporting shoulder upon the lateral surface thereof for its installation in a compressor cylinder.

In accordance with the invention, the supporting shoulder has a tapered lateral surface and is fitted over by one of the shrink rings.

Mounting the shrink ring directly upon the supporting shoulder of the valve reduces the height thereof, thereby resulting in a substantial reduction (approximately by 40 to 45 per cent) in the dead zone volume thus raising the efficiency and operating economy of the compressor.

In addition, a reduction in the height of the valve and, consequently, in the length of its channels lowers the resistance of the valve as a whole, which also raises the effectiveness of the compressor.

In one of the embodiments of the present invention, the inner surface of the shrink ring mounted upon the supporting shoulder is in contact with the tapered surface thereof along the entire length of the generatrix of the cone.

In another embodiment, the shrinking ring mounted upon the supporting shoulder is in contact with the tapered surface thereof along the smaller diameter of the cone, and for which purpose, the inner surface of the shrink ring has a somewhat greater cone angle than that of the surface of the supporting shoulder. This simplifies the design of the valve, as it eliminates the necessity of fixing the shrink ring relative to the height of the valve by means of locking plates.

It is expedient that the edge of the shrink ring which is in contact with the surface of the supporting shoulder be sharp enough to cut into that surface. This makes for a more reliable fastening of the shrink ring.

It is also expedient that the shrink ring be provided with at least two sharpened protrusions placed equidistantly along the periphery thereof and cutting into the tapered surface of the supporting shoulder.

This is preferable for the cases in which it is necessary to apply the shrink ring's pressure at certain points of the periphery.

The present invention will be more fully understood from the following description of preferred embodiments thereof taken in conjunction with the accompanying drawings, wherein:

DETAILED DESCRIPTION OF THE INVENTION

Figure 1:
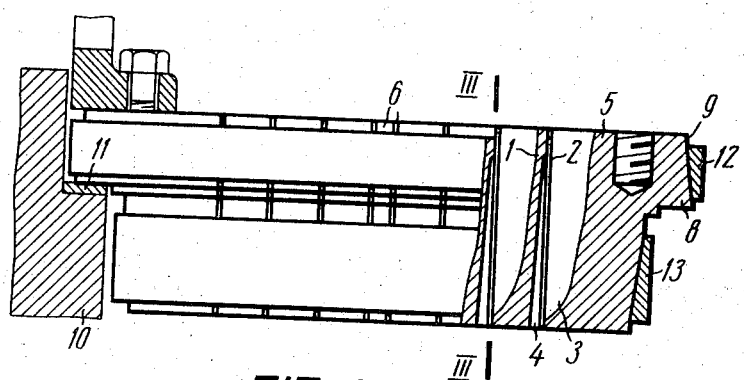
FIG. 1 is a side view partially in elevation and partly in cross section of a straightway valve, according to the invention having two shrink rings.

The present valve includes a disk defined by alternating flat seats 1 (FIG. 1) and elastic plates 2 arranged along parallel chords of the disk. The form of the seats 1 and plates 2 is basically similar to that of conventional ones. The seats 1 are defined as rigid strips having on one side, transverse grooves 3 for the passage of a medium and on the other, recesses 4 for the movement of the elastic plate 2 which is adjacent to the seat 1. Extreme lateral seats 5 (FIG. 2) are in the form of segments.

Arranged in the middle of the valve along the diameter of the disk is a circuit block 6 on both sides of which abut the elastic plates 2.

The lateral seats 5 have on the side facing the adjoining elastic plates 2, the grooves 3 for the passage of a medium, whereas the circuit block is provided with the recesses 4 for the movement of the elastic plates 2 under the pressure of the medium.

The elastic plates 2 are clamped between the seats 1 and 5, forming an open rectangular loop. The portion of the plates 2 (FIG. 3) clamped between the seats 1 is hatched. In order to ensure mobility of its middle portion, each elastic plate 2 has transverse slots 7 near its clamped portions.

In the upper (referring to the drawing) part of the valve there is a supporting shoulder 8, whose lateral surface 9 is tapered, according to the invention. The supporting shoulder 9 is designed to secure the valve in the seat of a compressor cylinder 10 (FIG. 1) and seal it therein by means of a seal 11 abutting upon the lower (with reference to the drawing) end face of the supporting shoulder 8.

The components constituting the valve are joined together by means of shrink rings 12 and 13, with one ring 12, in accordance with the invention, being mounted upon the lateral surface of the supporting shoulder 8. The other shrink ring 13 has a tapered inner surface and is mounted upon the lower portion (referring to the drawing) of the supporting shoulder 8 disposed in the seat of the compressor cylinder 10.

The shrink ring 13 is fixed relative to the height of the valve by the locking plates (not shown) provided with a T-shaped head. The lateral seats 5 have grooves on the outer surface thereof for the heads of the locking plates. After mounting the shrink ring 13, the ends of the plates are bent over the end face thereof.

Figure 3:
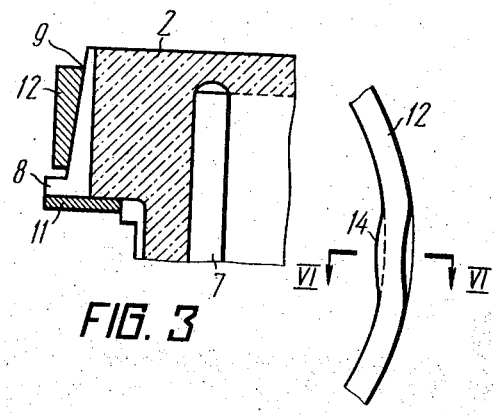
FIG. 3 is a section on line III—III of FIG. 1.
Figure 2:
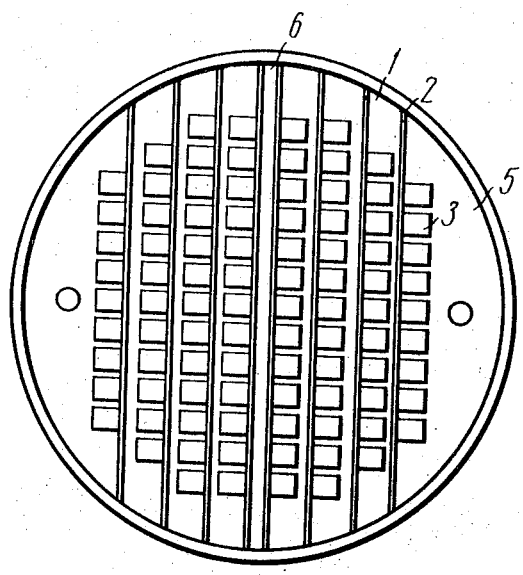
FIG. 2 is a plan view of a straightway valve, in accordance with the invention.

The proposed present valve is not a check valve, which means that it cannot be used both as an inlet valve and a delivery valve after being appropriately rearranged in the seat of the compressor cylinder 10. In inlet valves, the clamped portion of the movable part of the elastic plate 2, which is bent under the pressure of a medium, is located close to the end face of the valve on the side of the supporting shoulder 8 (FIG. 3). In the delivery valves, this clamped portion of the plate 2 is located near the opposite end face surface, i.e. in the portion of the valve which is found in the chamber of the compressor cylinder 10 (FIG. 1). A reversion of the valve turns an inlet valve into a delivery valve and vice versa, yet under the valve, a substantial dead-zone is formed, and hence, such a reversion is not envisaged.

The fact that the valve is not reversible eliminates the danger of the valve being installed in a reverse way in the seat of the compressor cylinder 10, which may lead to destruction of the compressor cylinder 10. In addition, inlet and delivery valves, as a rule, have elastic plates 2 of different thickness, which is in itself the reason why these are not interchangeable.

The stretching force of the shrink rings 12 and 13 is selected depending upon the design and purpose of the valve and is meant in each individual case to ensure the maximum reliability of the sealing of the joint between the seat 1 and the elastic plate 2 with a maximum difference in pressures. This applies to a greater extent to the delivery valve than to the inlet valve, because, as a gas is being drawn into the chamber of the compressor cylinder 10, the difference between the delivery pressure and the suction pressure in the delivery valve is applied to the entire surface of the elastic plates 2, including the portion thereof clamped between the seats 1. This force is, at its highest in the case of the longest plate 2, located along the chord closest to the diameter. This results in a force which tends to unseal the joints between the plates 2 and the seats 1, stretches and even disrupts the shrink rings 12 and 13. The invention envisages a number of ways of locking the shrink ring 12 mounted upon the supporting shoulder 8. FIG. 3 shows the shrink ring 12 mounted upon the tapered lateral surface 9 of the supporting shoulder 8, with the inner surface of the shrink ring 12 being in contact with the tapered surface 9 along the entire length of the generatrix of the cone. By moving the ring 12 along the generatrix of the cone, it is possible to adjust the stretching of the ring 12 and, consequently, the pressure-tightness of the joints between the plates 2 and the seats 1.

Figure 4:
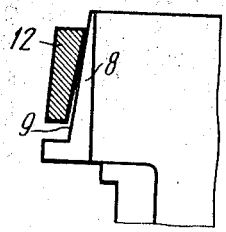
FIG. 4 is a fragmentary view in cross-section of a shrink ring having the cone angle greater than that of the surface of the supporting shoulder.

In another version of mounting the ring 12 upon the supporting shoulder 8 and locking the ring thereon, the cone angle of the ring 12 is somewhat greater than that of the surface 9 of the supporting shoulder 8 (FIG. 4). The edge of the shrink ring 12 in this case is made sharp enough to cut into the surface 9 of the supporting shoulder 8 which is made of a softer material than the ring 12.

Figure 5:
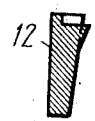
FIG. 5 is a plan view of a portion of the shrink ring having a protrusion.
Figure 6:
FIG. 6 is a section VI VI of FIG. 5.

In still another version, the ring 12 (FIG. 5 and 6) has two or more, depending on the valve's diameter, sharpened protrusions 14 to cut into the surface 9 of the supporting shoulder 8. Thus rules out the slipping off of the ring 12.

Figure 7:
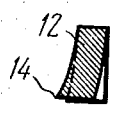
FIG. 7 is a sectional view of a portion of the shrink ring having a protrusion produced by the local caulking method.

In yet another version, the ring 12 is fixed relative to the surface 9 of the supporting shoulder 8 by means of local caulking (FIG. 7).

The present valve is of a lesser height than the known valve and the result is a substantial decrease in the dead-zone. This enables the valve to be used in refrigeration compressors in which the conventional straighway valves have not been used due to a great volume of the dead-zone. The reduced height of the valve makes it possible to lower the overall dimensions thereof.

The proposed straightway valve operates as follows: It is opened provided that the pressure in advance the valve is greater than that downstream after the valve. The difference in these pressures bends the movable portion of the plates 2 in the direction of the recesses 4 provided in the seats 1 and the circuit block 6.

This produces slots along the shape of the movable portions of the plates 2 between these plates and the planes of the seats 1 and 5 which have the grooves 3 for the passage of a medium, with the medium flowing through these slots. The valve is fully opened when a difference in the pressures bends the plates 2 so that they reach the bottom of the recesses 4. Further increase in the stream velocity and, consequently, in the pressure difference does not alter the orifice size.

The valve starts closing only when the difference in the pressures is lowered to a value less than the value required for complete opening of the valve. As this difference approaches zero, the deflection of the movable portion of the plates 2 is reduced until the valve is completely closed.

The valve in accordance with the invention has a lesser dead-zone, compared with the known straightway valve; in addition, it has lesser resistance due to a smaller length of its channels.

What is claimed is:

1. A straightway valve for compressors, including a disk; said disk being defined by alternating flat seats and elastic plates; said flat seats and elastic plates being arranged along parallel chords of the disk; shrink rings clasping the set of said seats and plates; a supporting shoulder on the lateral surface of the valve enabling the valve to be installed in a compressor cylinder; said supporting shoulder having a tapered lateral surface; and one of said shrink rings being mounted upon the tapered lateral surface of said supporting shoulder.

2. The straightway valve as claimed in claim 1, wherein the inner surface of the shrink ring mounted upon the supporting shoulder is in contact with the tapered surface thereof along the entire length of the generatrix of the cone.

3. The straightway valve as claimed in claim 1, wherein the shrink ring mounted upon the supporting shoulder is in contact with the tapered surface thereof along the lesser diameter of the cone, with the inner surface of the shrink ring having a somewhat greater cone angle than the surface of the supporting shoulder.

4. The straightway valve as claimed in claim 3, wherein the edge of the shrink ring which is in contact with the tapered surface of the supporting shoulder is sharp for cutting into said surface.

5. The straightway valve as claimed in claim 4, wherein the shrink ring has at least two sharpened protrusions arranged equidistantly upon the periphery thereof for cutting into the tapered surface of the supporting shoulder.

* * * * *